United States Patent
Aoki

(10) Patent No.: US 9,781,333 B2
(45) Date of Patent: Oct. 3, 2017

(54) IMAGING DEVICE AND FOCUS CONTROL METHOD

(71) Applicant: FUJIFILM Corporation, Tokyo (JP)

(72) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/456,188

(22) Filed: Mar. 10, 2017

(65) Prior Publication Data

US 2017/0187951 A1 Jun. 29, 2017

Related U.S. Application Data

(63) Continuation of application No. PCT/JP2015/063794, filed on May 13, 2015.

(30) Foreign Application Priority Data

Sep. 11, 2014 (JP) .................................. 2014-185162

(51) Int. Cl.
H04N 5/232 (2006.01)
G02B 7/14 (2006.01)

(52) U.S. Cl.
CPC ........... *H04N 5/23212* (2013.01); *G02B 7/14* (2013.01)

(58) Field of Classification Search
CPC .... G02B 7/34; H04N 5/23212; H04N 5/3572; H04N 5/3696
See application file for complete search history.

(56) References Cited

U.S. PATENT DOCUMENTS

| | | | |
|---|---|---|---|
| 2005/0041949 A1 | 2/2005 | Onuki et al. | |
| 2012/0007997 A1* | 1/2012 | Oikawa | G03B 13/36 348/208.6 |

(Continued)

FOREIGN PATENT DOCUMENTS

| | | |
|---|---|---|
| JP | 10-268382 A | 10/1998 |
| JP | 11-249005 A | 9/1999 |

(Continued)

OTHER PUBLICATIONS

International Search Report issued in PCT/JP2015/063794 (PCT/ISA/210), dated Aug. 18, 2015

(Continued)

*Primary Examiner* — Amy Hsu
(74) *Attorney, Agent, or Firm* — Birch, Stewart, Kolasch & Birch, LLP

(57) ABSTRACT

A phase difference AF processing unit of a digital camera including an imaging element that captures an image of an object through a lens device including an APD filter and includes a pair of phase difference detection pixels calculates a parameter related to a ratio of a phase difference between detection signals detected by each of the phase difference detection pixels to an amount of defocus based on the incident angle range of light on the pair of phase difference detection pixels through the lens device, the transmittance of a region of the APD filter through which light in the incident angle range passes, and a light reception sensitivity distribution indicating the light reception sensitivity of each of the phase difference detection pixels for each incident angle of light and calculates the amount of defocus using the parameter and the phase difference.

12 Claims, 11 Drawing Sheets

(56) References Cited

U.S. PATENT DOCUMENTS

| | | | | |
|---|---|---|---|---|
| 2012/0224096 A1* | 9/2012 | Shimoda | ............... | G02B 7/36 |
| | | | | 348/349 |
| 2014/0071322 A1* | 3/2014 | Fukuda | ............ | H04N 5/23212 |
| | | | | 348/332 |
| 2014/0211075 A1* | 7/2014 | Inoue | .................... | G02B 7/28 |
| | | | | 348/349 |
| 2014/0211076 A1* | 7/2014 | Inoue | .................... | G02B 7/34 |
| | | | | 348/349 |
| 2015/0109518 A1* | 4/2015 | Ishii | ............... | H04N 5/23212 |
| | | | | 348/353 |
| 2016/0044230 A1* | 2/2016 | Yoshimura | .......... | H04N 5/3572 |
| | | | | 348/353 |
| 2016/0088245 A1* | 3/2016 | Nakata | ............... | H04N 9/045 |
| | | | | 250/201.2 |

FOREIGN PATENT DOCUMENTS

| | | |
|---|---|---|
| JP | 2003-241075 A | 8/2003 |
| JP | 2005-62732 A | 3/2005 |
| JP | 2011-221120 A | 11/2011 |
| JP | 2014-63100 A | 4/2014 |
| WO | WO 2013/047111 A1 | 4/2013 |

OTHER PUBLICATIONS

Written Opinion of the International Searching Authority issued in PCT/JP2015/063794 (PCT/ISA/237) dated Aug. 18, 2015.

* cited by examiner

IMAGING DEVICE AND FOCUS CONTROL METHOD

CROSS REFERENCE TO RELATED APPLICATION

This is a continuation of International Application No. PCT/JP2015/063794 filed on May 13, 2015, and claims priority from Japanese Patent Application No. 2014-185162 filed on Sep. 11, 2014, the entire disclosures of which are incorporated herein by reference.

BACKGROUND OF THE INVENTION

1. Field of the Invention

The present invention relates to an imaging device and a focus control method.

2. Description of the Related Art

In recent years, with an increase in the resolution of solid-state imaging elements, such as a charge coupled device (CCD) image sensor and a complementary metal oxide semiconductor (CMOS) image sensor, a demand for a digital still camera, a digital video camera, a mobile phone, such as a smart phone, and an information apparatus with an imaging function, such as a personal digital assistant (PDA; a portable information terminal), has been increased rapidly. In addition, the above-mentioned information apparatus with an imaging function is referred to as an imaging device.

Some of the imaging devices use a phase difference auto focus (AF) system as a focus control method which detects the distance to a main object and focuses the imaging device on the object.

WO2013/047111A discloses a technique which prepares a small amount of correction data for the amount of defocus of each imaging lens and can perform high-accuracy focus control using the phase difference AF system, regardless of the type of imaging lens, in a case in which an imaging device using the phase difference AF system is a lens interchangeable type.

An apodization filter (hereinafter, referred to as an APD filter) has been known as an optical filter for improving the quality of an image that is out of focus, that is, a so-called blurred image. When the APD filter is used, it is possible to smooth the contour of a blurred image.

JP1998-268382A (JP-H10-268382A) and JP2011-221120A disclose an imaging device in which an APD filter can be inserted into and removed from the optical axis of an imaging lens.

SUMMARY OF THE INVENTION

In WO2013/047111A, a parameter related to the ratio of a phase difference to the amount of defocus is calculated on the basis of the information of an imaging lens and a light reception sensitivity distribution which is light reception sensitivity for each incident angle of incident light on a pair of phase difference detection pixels and the amount of defocus is calculated using the parameter.

However, in a case in which an imaging optical system includes an APD filter, light beams that are incident on a light receiving surface of an imaging element are partially shielded by the APD filter. Therefore, the light reception sensitivity of the pair of phase difference detection pixels is reduced by a value corresponding to the shielded light beams. As a result, the parameter is calculated on a light reception sensitivity distribution that is different from the actual light reception sensitivity distribution and the calculated amount of defocus is likely to be different from the actual value.

JP1998-268382A (JP-H10-268382A) and JP2011-221120A disclose an imaging device comprising an APD filter, but do not disclose an influence on AF.

The invention has been made in view of the above-mentioned problems and an object of the invention is to provide an imaging device that can be focused on an object with high accuracy even in a case in which an imaging optical system includes an APD filter and a focus control method in the imaging device.

An imaging device according to the invention comprises: an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received; a defocus amount calculation unit that, in a state in which an optical filter, of which transmittance is reduced as a distance from a center of an optical axis of the imaging optical system in a direction perpendicular to the optical axis increases, is present on the optical axis of the imaging optical system, acquires an incident angle range of light on the pair through the imaging optical system, a transmittance distribution of the optical filter, and a light reception sensitivity distribution indicating light reception sensitivity of each of the pair for each incident angle of incident light, calculates a parameter related to a ratio of a phase difference between detection signals detected by the pair to an amount of defocus based on the acquired incident angle range, the acquired transmittance distribution and the acquired light reception sensitivity distribution, and calculates the amount of defocus using the calculated parameter and the phase difference; and a focus control unit that performs focus control for moving the focus lens in an optical axis direction based on the amount of defocus calculated by the defocus amount calculation unit.

A focus control method according to the invention is performed by an imaging device comprising an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received. The focus control method comprises: a defocus amount calculation step of, in a state in which an optical filter, of which transmittance is reduced as a distance from a center of an optical axis of the imaging optical system in a direction perpendicular to the optical axis increases, is present on the optical axis of the imaging optical system, acquiring an incident angle range of light on the pair through the imaging optical system, a transmittance distribution of the optical filter, and a light reception sensitivity distribution indicating light reception sensitivity of each of the pair for each incident angle of incident light, calculating a parameter related to a ratio of a phase difference between detection signals detected by the pair to an amount of defocus based on the acquired incident angle range, the acquired transmittance distribution and the acquired light reception sensitivity distribution, and calculating the amount of defocus using the calculated parameter and the phase difference; and a focus control step of performing focus control for moving the focus lens in an optical axis direction based on the amount of defocus calculated in the defocus amount calculation step.

According to the invention, it is possible to provide an imaging device that can be focused on an object with high accuracy even in a case in which an imaging optical system includes an APD filter and a focus control method in the imaging device.

DESCRIPTION OF THE PREFERRED EMBODIMENTS

Hereinafter, an embodiment of the invention will be described with reference to the drawings.

Figure 1:
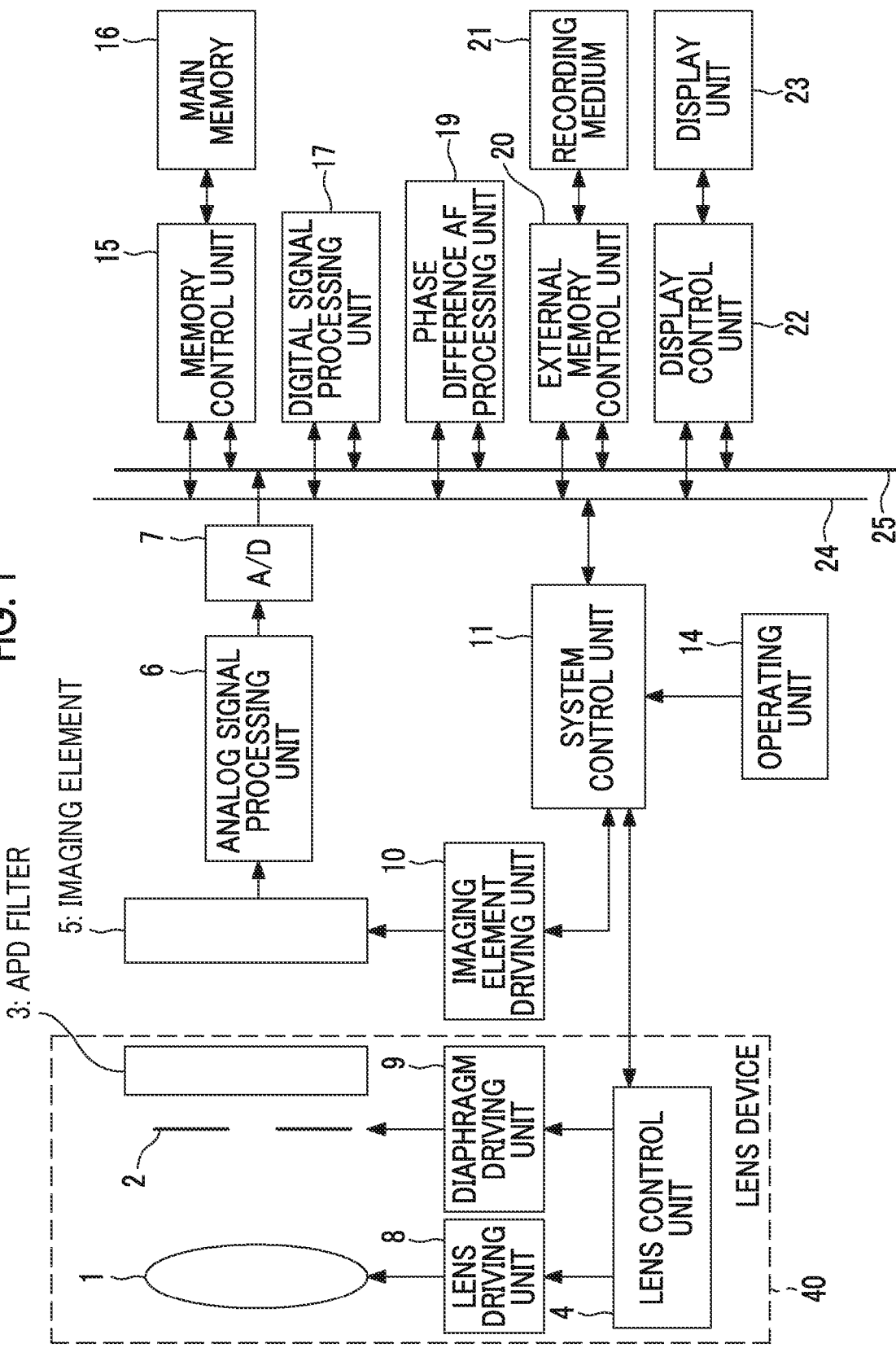
FIG. 1 is a diagram schematically illustrating the structure of a digital camera which is an example of an imaging device for describing an embodiment of the invention.

FIG. 1 is a diagram schematically illustrating the structure of a digital camera as an example of an imaging device for describing an embodiment of the invention.

The digital camera illustrated in FIG. 1 comprises a lens device 40 including an imaging lens 1 that includes a focus lens for focus adjustment and a zoom lens for changing a zoom magnification, a diaphragm 2, an APD filter 3, a lens control unit 4, a lens driving unit 8, and a diaphragm driving unit 9. In this embodiment, the lens device 40 is attachable to and detachable from a digital camera body. However, the lens device 40 may be fixed to the digital camera body.

The lens device 40 forms an imaging optical system and includes at least the focus lens. The focus lens means a lens that is moved in an optical axis direction to adjust the focus position of the imaging optical system. In a case in which the imaging lens including a plurality of lenses is a unit focus lens, all of the lens groups are the focus lenses.

The APD filter 3 is an optical filter of which the transmittance is reduced as the distance from the center of the optical axis of the imaging optical system in a direction perpendicular to the optical axis increases. As the lens device 40, a type in which the APD filter 3 is fixed on the optical axis as illustrated in FIG. 1 or a type in which a state in which the APD filter 3 is inserted into the optical axis and a state in which the APD filter 3 is evacuated from the optical axis can be switched can be mounted on the digital camera body. In addition, the lens device 40 without the APD filter 3 can be mounted on the digital camera body.

The lens control unit 4 of the lens device 40 is configured to communicate with a system control unit 11 of the digital camera body wirelessly or in a wired manner. The lens control unit 4 drives the focus lens included in the imaging lens 1 through the lens driving unit 8 or drives the diaphragm 2 through the diaphragm driving unit 9, in response to commands from the system control unit 11.

In a case in which the lens device 40 is a type in which the APD filter 3 can be inserted into or removed from the optical axis, the lens control unit 4 performs control such that the APD filter 3 is inserted into the optical axis or is evacuated from the optical axis, in response to commands from the system control unit 11.

The lens control unit 4 is provided with a memory and the memory stores information indicating whether the APD filter 3 is present in the lens device 40, information about a transmittance distribution of the APD filter 3 in a case in which the lens device is provided with the APD filter 3, and imaging lens information which is the design information of the imaging lens 1.

The lens control unit 4 can communicate with the system control unit 11 wirelessly or in a wired manner and transmits various kinds of information stored in the memory to the system control unit 11 in response to a request from the system control unit 11. In a case in which the lens device 40 is the type in which the APD filter 3 can be inserted into or removed from the optical axis, the lens control unit 4 also transmits information indicating whether the APD filter 3 has been inserted into the optical axis to the system control unit 11.

The digital camera body comprises an imaging element 5 that is, for example, a charge coupled device (CCD) type or a complementary metal oxide semiconductor (CMOS) type and captures an image of an object through the imaging optical system, an analog signal processing unit 6 that is connected to the output of the imaging element 5 and performs analog signal processing, such as a correlated double sampling process, and an A/D conversion circuit 7 that converts an analog signal output from the analog signal processing unit 6 into a digital signal. The analog signal processing unit 6 and the A/D conversion circuit 7 are controlled by the system control unit 11. The analog signal processing unit 6 and the A/D conversion circuit 7 are provided in the imaging element 5.

The system control unit 11 that controls the overall operation of an electric control system of the digital camera drives the imaging element 5 through an imaging element driving unit 10 and outputs an object image captured through the lens device 40 as a captured image signal. An instruction signal from a user is input to the system control unit 11 through an operating unit 14.

The system control unit 11 functions as a focus control unit that performs focus control for moving the focus lens to a focus position on the basis of the amount of defocus calculated by a phase difference AF processing unit 19.

In addition, the electric control system of the digital camera comprises a main memory 16, a memory control unit 15 that is connected to the main memory 16, a digital signal processing unit 17 that performs, for example, an interpolation operation, a gamma correction operation, and an RGB/YC conversion process for the captured image signal output from the A/D conversion circuit 7 to generate captured image data, the phase difference AF processing unit 19 that calculates the amount of defocus using a phase difference AF system, an external memory control unit 20 to which an attachable and detachable recording medium 21 is connected, and a display control unit 22 to which a display unit 23 mounted on, for example, the rear surface of the camera is connected.

The memory control unit 15, the digital signal processing unit 17, the phase difference AF processing unit 19, the external memory control unit 20, and the display control unit 22 are connected to each other by a control bus 24 and a data bus 25 and are controlled by commands output from the system control unit 11.

Figure 2:
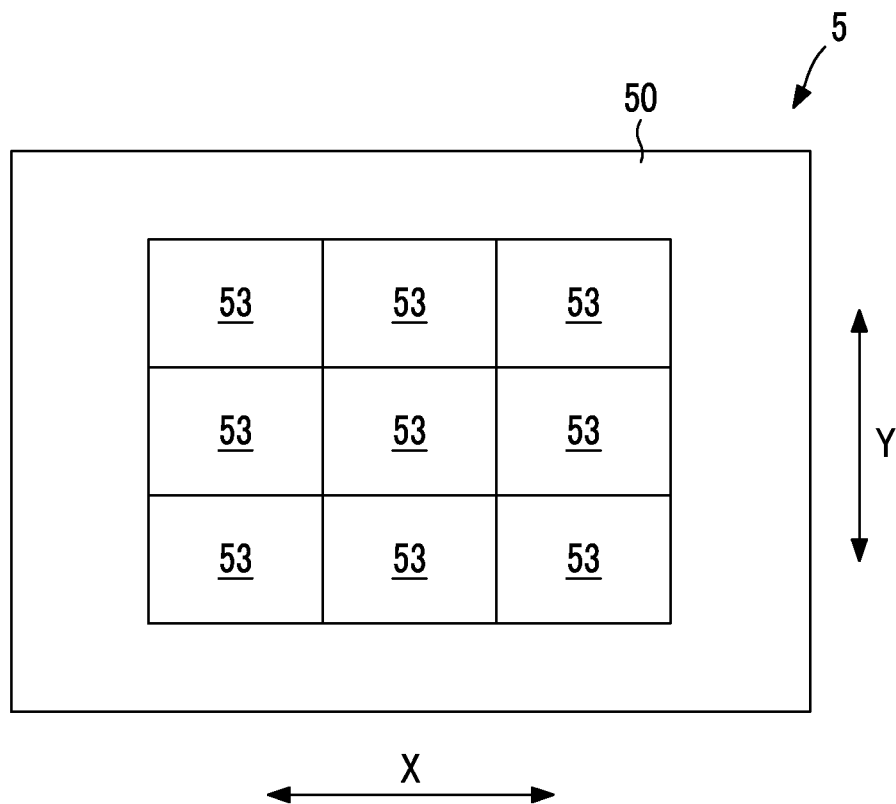
FIG. 2 is a plan view schematically illustrating the overall structure of an imaging element 5 provided in the digital camera illustrated in FIG. 1.

FIG. 2 is a plan view schematically illustrating the overall structure of the imaging element 5 mounted on the digital camera illustrated in FIG. 1.

The imaging element 5 has a light receiving surface 50 on which a plurality of pixels are two-dimensionally arranged in a row direction X and a column direction Y perpendicular to the row direction X. In the example illustrated in FIG. 2, nine AF areas 53 which are focus areas are provided on the light receiving surface 50.

The AF area 53 includes imaging pixels and phase difference detection pixels as pixels.

In the light receiving surface 50, only the imaging pixels are disposed in a portion other than the AF areas 53. The AF areas 53 may be provided on the light receiving surface 50 without a gap therebetween.

Figure 3:
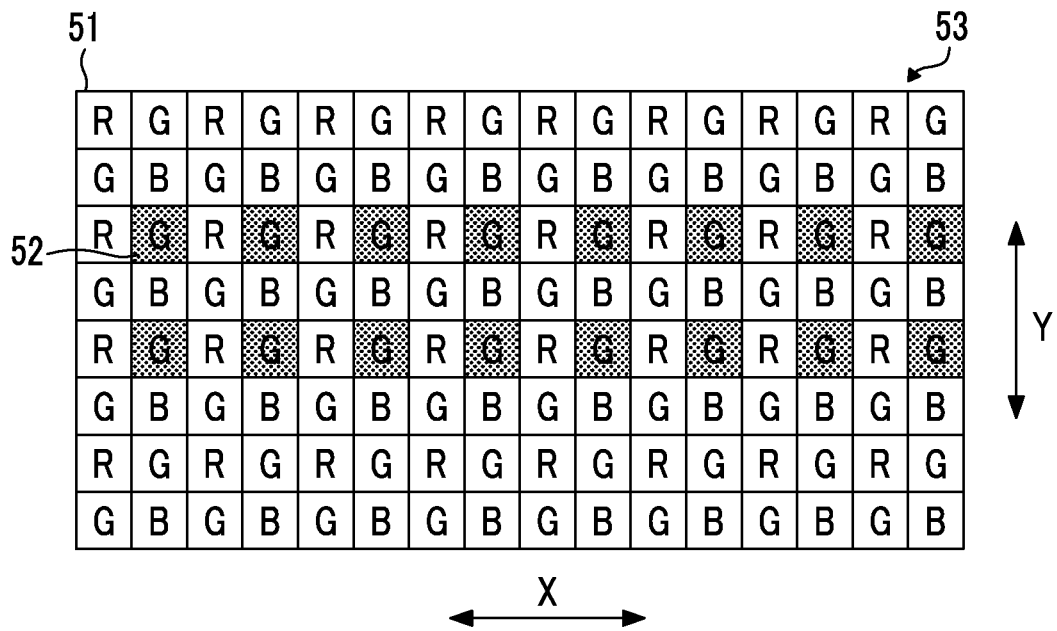
FIG. 3 is a partial enlarged view illustrating one AF area 53 illustrated in FIG. 2.

FIG. 3 is a partial enlarged view illustrating one AF area 53 illustrated in FIG. 2.

In the AF area 53, pixels 51 are two-dimensionally arranged. Each pixel 51 includes a photoelectric conversion unit, such as a photodiode, and a color filter that is formed above the photoelectric conversion unit.

In FIG. 3, a letter "R" is given to a pixel 51 (which is also referred to as an R pixel 51) including a color filter (R filter) that transmits red light, a letter "G" is given to a pixel 51 (which is also referred to as a G pixel 51) including a color filter (G filter) that transmits green light, and a letter "B" is given to a pixel 51 (which is also referred to as a B pixel 51) including a color filter (B filter) that transmits blue light. The color filters are arranged in a Bayer array on the entire light receiving surface 50.

In the AF area 53, some (hatched pixels 51 in FIG. 3) of the G pixels 51 are the phase difference detection pixels 52. In the example illustrated in FIG. 3, among pixel rows including the R pixel 51 and the G pixel 51, each G pixel 51 in an arbitrary pixel row and the G pixels 51 which are closest to each G pixel 51 in the column direction Y are the phase difference detection pixels 52. Here, as illustrated in FIG. 3, one direction in the two-dimensional array is defined as the row direction X and the other direction is defined as the column direction Y.

Figure 4:
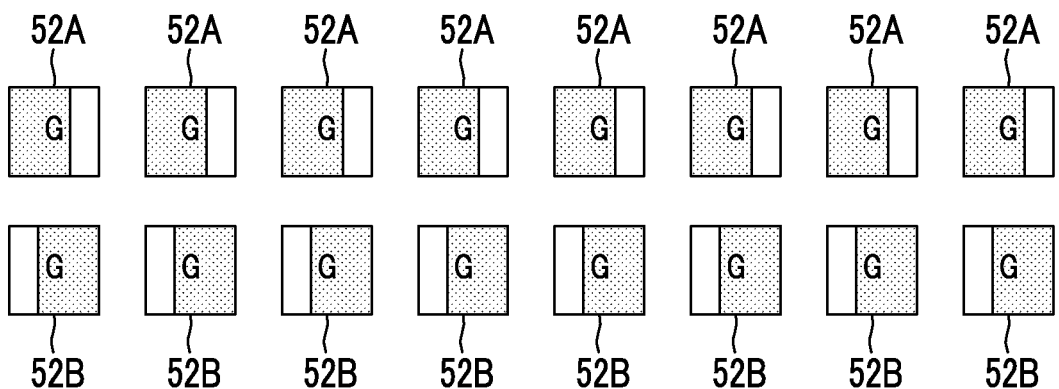
FIG. 4 is a diagram illustrating only phase difference detection pixels 52 illustrated in FIG. 3.

FIG. 4 is a diagram illustrating only the phase difference detection pixels 52 illustrated in FIG. 3.

As illustrated in FIG. 4, the phase difference detection pixels 52 include two types of pixels, that is, a phase difference detection pixel 52A and a phase difference detection pixel 52B.

The phase difference detection pixel 52A is a first signal detection unit that receives one of a pair of light beams which pass through different portions of a pupil region of the imaging lens 1 and detects a signal corresponding to the amount of light received.

The phase difference detection pixel 52B is a second signal detection unit that receives other of the pair of light beams and detects a signal corresponding to the amount of light received.

In the AF area 53, a plurality of pixels 51 other than the phase difference detection pixels 52A and 52B are the imaging pixels. The imaging pixel receives the pair of light beams passing through the imaging lens 1 and detects a signal corresponding to the amount of light received.

A light shielding film is provided above the photoelectric conversion unit of each pixel 51. An opening that defines the light receiving area of the photoelectric conversion unit is formed in the light shielding film.

The center of the opening of the imaging pixel 51 is aligned with the center of the photoelectric conversion unit of the imaging pixel 51. In contrast, the center of an opening (a white portion in FIG. 4) of the phase difference detection pixel 52A deviates from the center of the photoelectric conversion unit of the phase difference detection pixel 52A to the right. In addition, the center of an opening (a white portion in FIG. 4) of the phase difference detection pixel 52B deviates from the center of the photoelectric conversion unit of the phase difference detection pixel 52B to the left. Here, the right side is one side of the row direction X illustrated in FIG. 3 and the left side is the other side of the row direction X.

Figure 5:
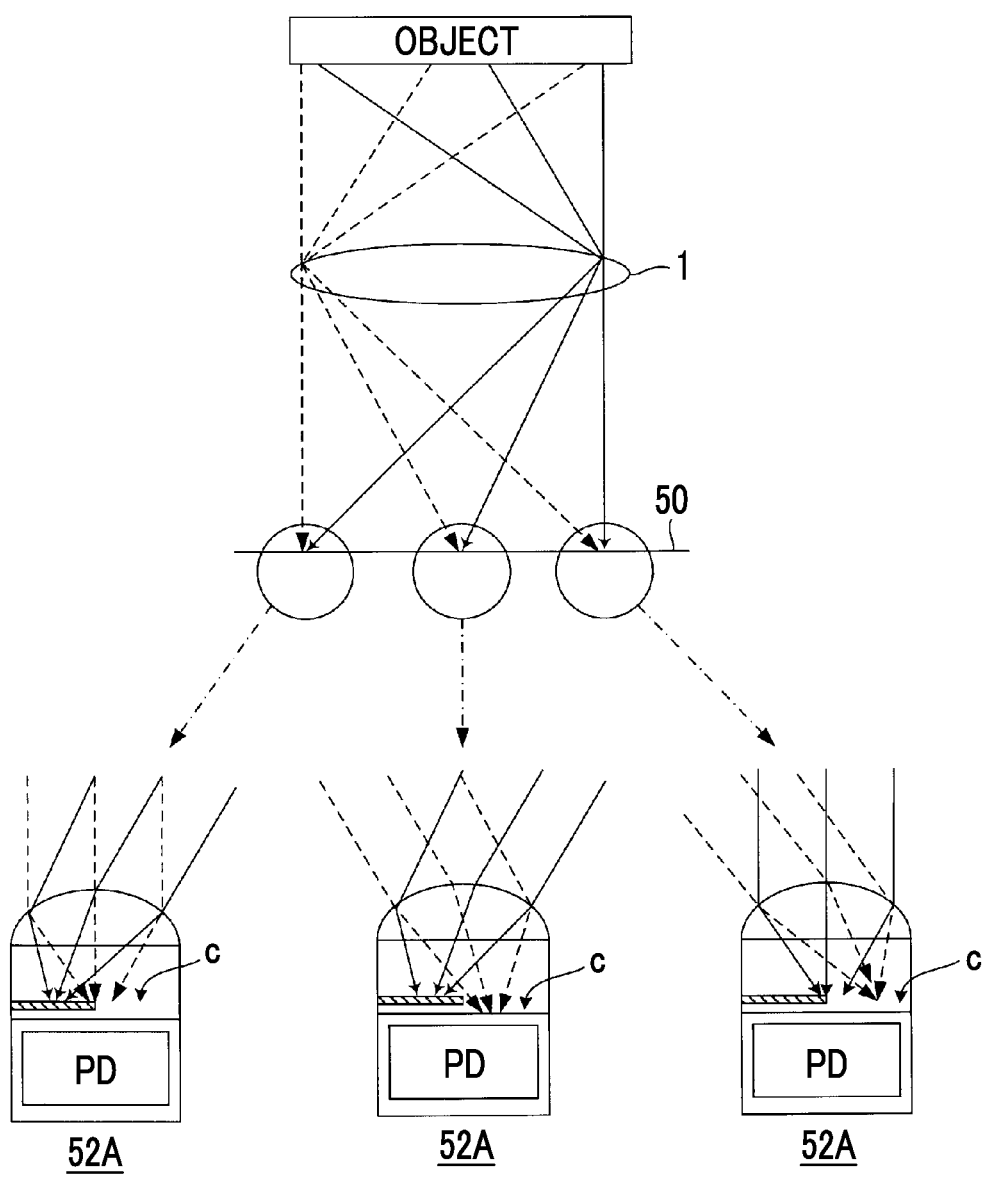
FIG. 5 is a diagram illustrating the cross-sectional structure of a phase difference detection pixel 52A.

FIG. 5 is a diagram illustrating the cross-sectional structure of the phase difference detection pixel 52A. As illustrated in FIG. 5, an opening c of the phase difference detection pixel 52A deviates to the right with respect to the photoelectric conversion unit (PD). As illustrated in FIG. 5, when one side of the photoelectric conversion unit is covered with the light shielding film, it is possible to selectively shield light which is incident in a direction opposite to the direction in which the photoelectric conversion unit is covered with the light shielding film.

According to this structure, a phase difference in the row direction X between the images captured by a pixel group including the phase difference detection pixels 52A in an arbitrary row and a pixel group including the phase difference detection pixels 52B which are arranged at the same distance from each phase difference detection pixel 52A of the pixel group in one direction can be detected by the two pixel groups.

The imaging element 5 is not limited to the structure illustrated in FIGS. 2 to 5 as long as it has a plurality of pairs of the signal detection units that receive one of the pair of light beams passing through different portions of the pupil region of the imaging lens 1 and detect a signal corresponding to the amount of light received and the signal detection units that receive other of the pair of light beams and detect a signal corresponding to the amount of light received.

For example, the imaging element 5 may have a structure in which all of the pixels included in the imaging element 5 are used as the imaging pixels 51, each imaging pixel 51 is divided into two areas, one of the two divided areas is used as the phase difference detection pixel 52A, and the other divided area is used as the phase difference detection pixel 52B.

Figure 6:
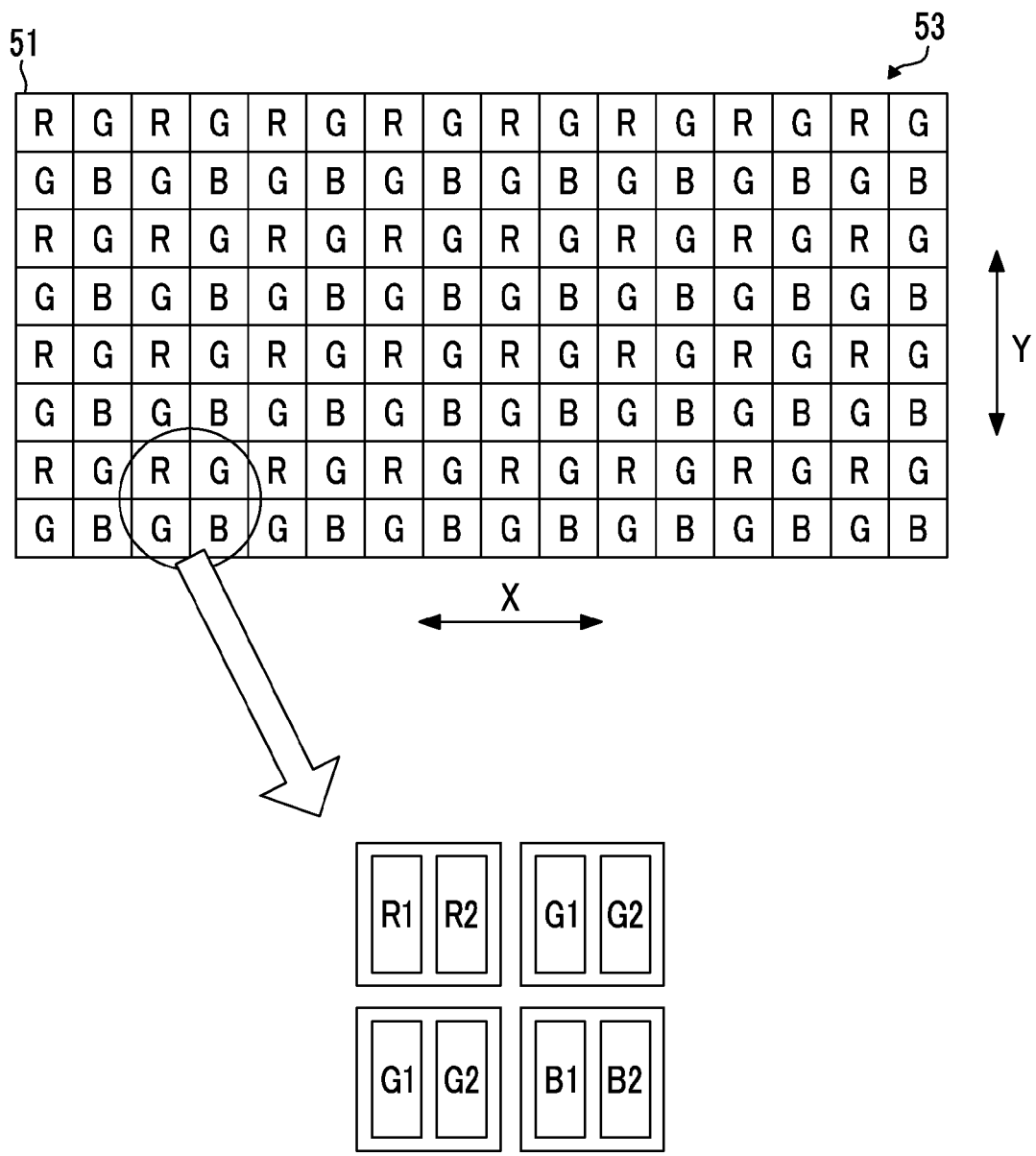
FIG. 6 is a diagram illustrating a structure in which all of the pixels included in the imaging element 5 are used as imaging pixels 51 and each imaging pixel 51 is divided into two areas.

FIG. 6 is a diagram illustrating the structure in which all of the pixels included in the imaging element 5 are used as the imaging pixels 51 and each imaging pixel 51 is divided into two areas.

In the structure illustrated in FIG. 6, in the imaging element 5, the imaging pixel 51, to which the letter "R" is given, is divided into two areas, and two divided areas are used as a phase difference detection pixel R1 and a phase difference detection pixel R2. In the imaging element 5, the imaging pixel 51, to which the letter "G" is given, is divided into two areas, and two divided areas are used as a phase difference detection pixel G1 and a phase difference detection pixel G2. In the imaging element 5, the imaging pixel 51, to which the letter "B" is given, is divided into two areas, and two divided areas are used as a phase difference detection pixel B1 and a phase difference detection pixel B2.

In this structure, the phase difference detection pixels R1, G1, and B1 are the first signal detection units and the phase difference detection pixels R2, G2, and B2 are the second signal detection units. Signals can be independently read from the first signal detection units and the second signal detection units. When signals from the first signal detection units and the second signal detection units are added, it is possible to obtain a normal imaging signal without a phase difference. That is, in the structure illustrated in FIG. 6, all of the pixels can be used as both the phase difference detection pixels and the imaging pixels.

The phase difference AF processing unit 19 illustrated in FIG. 1 calculates a phase difference which is the amount of relative positional deviation between two images formed by the pair of light beams, using a detection signal group read from the phase difference detection pixels 52A and the phase difference detection pixels 52B in one AF area 53 which is selected from nine AF areas 53 by, for example, an operation of the user.

The phase difference AF processing unit 19 calculates the focus-adjusted state of the imaging lens 1 on the basis of the phase difference. Here, the phase difference AF processing unit 19 calculates the amount of deviation from a focus state and a deviation direction from the focus state, that is, the amount of defocus.

Specifically, when data of a detection signal group from a plurality of phase difference detection pixels 52A in the selected AF area 53 is A[1] . . . A[k], data of a detection signal group from the phase difference detection pixels 52B which form a pair with the phase difference detection pixels 52A is B[1] . . . B[k], and the deviation between two data items is "d", the phase difference AF processing unit 19 calculates an area S [d] that is surrounded by two data waveforms calculated by the following expression.

$$S[d] = \sum_{n=1}^{k} (A[n+d] - B[n])^2 \quad (1)$$

$$d = -L, \ldots, -2, -1, 0, 1, 2, \ldots, L$$

The phase difference AF processing unit 19 calculates, as the phase difference, the value of d when a correlation value S[d] is the minimum and calculates the amount of defocus from the phase difference.

Figure 7:
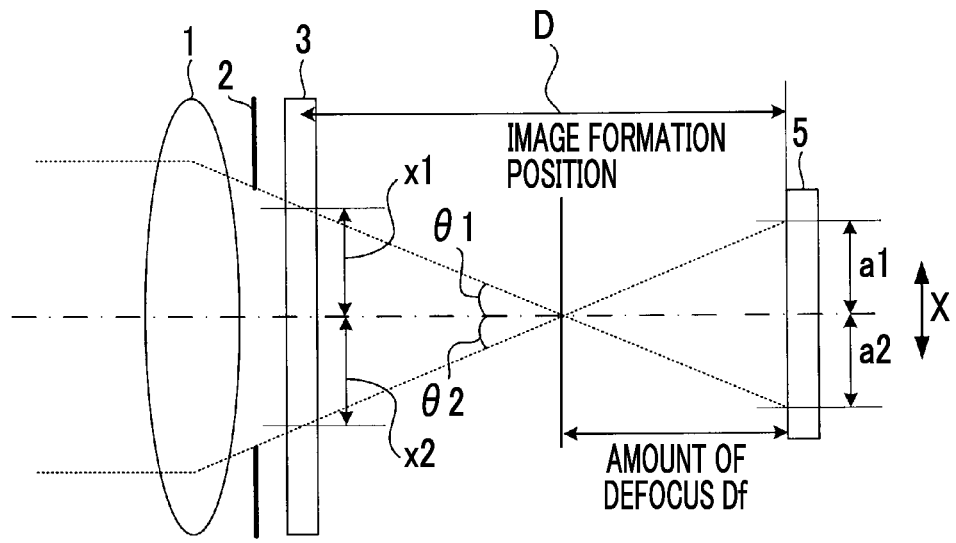
FIG. 7 is a diagram illustrating the relationship between a phase difference, the amount of defocus, and an incident angle.

FIG. 7 is a diagram illustrating the relationship between the phase difference and the amount of defocus. In FIG. 7, a light beam incident on the vicinity of a point that intersects the optical axis on the light receiving surface of the imaging element 5 is represented by a dashed line.

The incident angle θ of light on the imaging element 5 through the lens device 40 is determined by the amount of opening of the diaphragm 2. In FIG. 7, an angle formed between an upper light beam that passes through the upper end of an opening region of the diaphragm 2 and a main light beam among the light beams passing through the diaphragm 2 is an incident angle θ1 and an angle formed between a lower light beam that passes through the lower end of the opening region of the diaphragm 2 and the main light beam is an incident angle θ2. In addition, the distance between an intersection point between the lower light beam and the light receiving surface of the imaging element 5 and an intersection point between the main light beam and the light receiving surface of the imaging element 5 is a1 and the distance between an intersection point between the upper light beam and the light receiving surface of the imaging element 5 and the intersection point between the main light beam and the light receiving surface of the imaging element 5 is a2.

In the description of the incident angle of light on the imaging element 5, the incident angle formed between the upper light beam and the main light beam is positive and the incident angle formed between the lower light beam and the main light beam is negative.

As illustrated in FIG. 7, the amount of defocus Dff is a value indicating the distance between the light receiving surface of the imaging element 5 and the position where an object image is formed by the imaging optical system.

The incident angles θ1 and θ2, the distances a1 and a2, and the amount of defocus Dff have a predetermined functional relationship therebetween and Expression (2) and Expression (3) are established.

$$\tan \theta 1 = a1/Df \quad (2)$$

$$\tan |\theta 2| = a2/Df \quad (3)$$

The following Expression (4) is obtained from Expressions (2) and (3).

$$\tan \theta 1 + \tan |\theta 2| = (a1+a2)/Df \quad (4)$$

Here, the phase difference calculated by the phase difference AF processing unit 19 corresponds to the sum of the distance a1 and the distance a2. That is, when the phase difference and the incident angles θ1 and θ2 are known, it is possible to calculate the amount of defocus Dff using Expression (4). As can be seen from Expression (4), the incident angles θ1 and θ2 are parameters related to the ratio of the phase difference to the amount of defocus Dff.

The phase difference AF processing unit 19 calculates the incident angle θ1 and the incident angle θ2, in addition to the phase difference, in order to calculate the amount of defocus Dff. Next, a method for calculating the incident angle θ1 and the incident angle θ2 will be described.

The incident angle θ1 and the incident angle θ2 illustrated in FIG. 7 are fixed values when the amount of opening (F-number) of the diaphragm 2 is determined. However, the phase difference detection pixels 52A and 52B used to calculate the phase difference have the characteristics (incident angle sensitivity characteristics) that the light reception sensitivity thereof varies depending on the incident angle of light.

The APD filter 3 is provided in the lens device 40. Therefore, the incident angle sensitivity characteristics of the phase difference detection pixels 52A and 52B become complicated in combination with the transmittance characteristics of the APD filter 3.

The incident angle of light on an arbitrary pair of the phase difference detection pixels varies in various ways in an incident angle range from the incident angle θ1 to the incident angle θ2.

Therefore, when the incident angle θ1 and the incident angle θ2 determined by the F-number are substituted into Expression (4) without any change, it is difficult to accurately calculate the amount of defocus.

The phase difference AF processing unit 19 acquires information about the incident angle range (the incident angles θ1 and θ2 in FIG. 7) determined by the F-number of the diaphragm 2, information indicating the light reception sensitivity distribution of each of the phase difference detection pixels 52A and 52B for each incident angle, and information about the transmittance distribution of the APD filter 3. Then, the phase difference AF processing unit 19 calculates a value (θ1A) to be substituted into "θ1" of Expression (4) and a value (θ2A) to be substituted into "θ2" of Expression (4), on the basis of the acquired three information items. In this way, it is possible to accurately calculate the amount of defocus. Next, a method for calculating θ1A and θ2A will be described.

Figure 8:
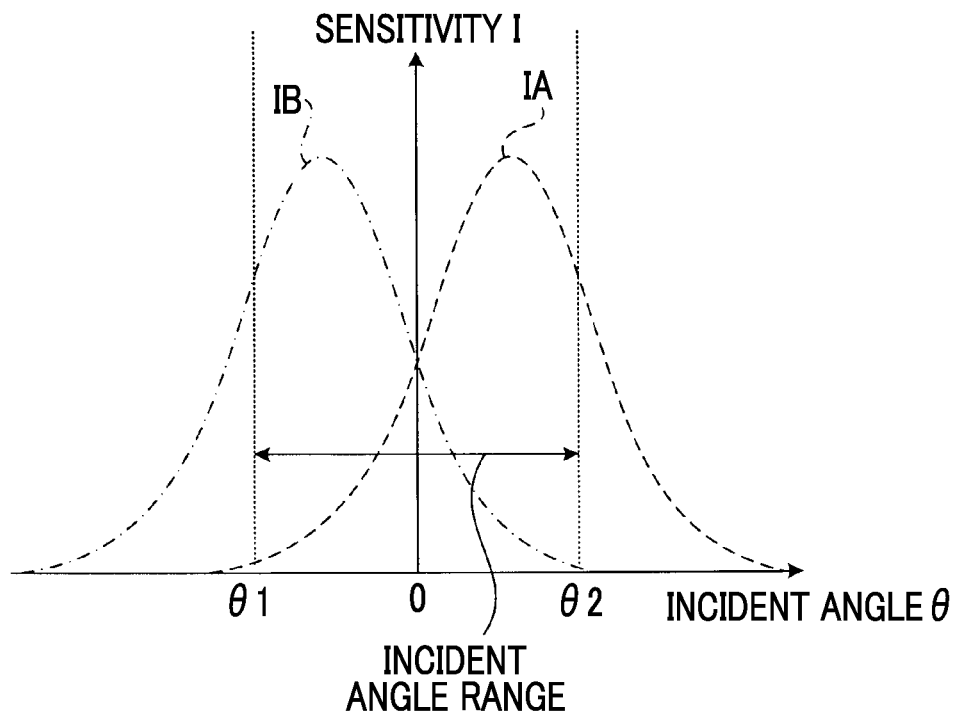
FIG. 8 is a diagram illustrating the light reception sensitivity distributions of phase difference detection pixels 52A and 52B.

FIG. 8 is a diagram illustrating the light reception sensitivity distributions of the phase difference detection pixel 52A and the phase difference detection pixel 52B. In FIG. 8, letters IA indicate the light reception sensitivity distribution of the phase difference detection pixel 52A and letters IB indicates the light reception sensitivity distribution of the phase difference detection pixel 52B.

In FIG. 8, the horizontal axis indicates the incident angle θ and the vertical axis indicates the sensitivity I of the pixel. The light reception sensitivity distributions illustrated in FIG. 8 are determined by the structure of the phase difference detection pixels 52A and 52B, are measured in the stage in which the digital camera is manufactured, and are stored in the main memory 16 of the digital camera.

When the F-number of the diaphragm 2 is determined, the range of the incident angle of light on the imaging element 5 is uniquely determined. In FIG. 8, the incident angle range corresponding to the F-number is from the incident angle θ=θ1 to the incident angle θ=θ2.

Figure 9:
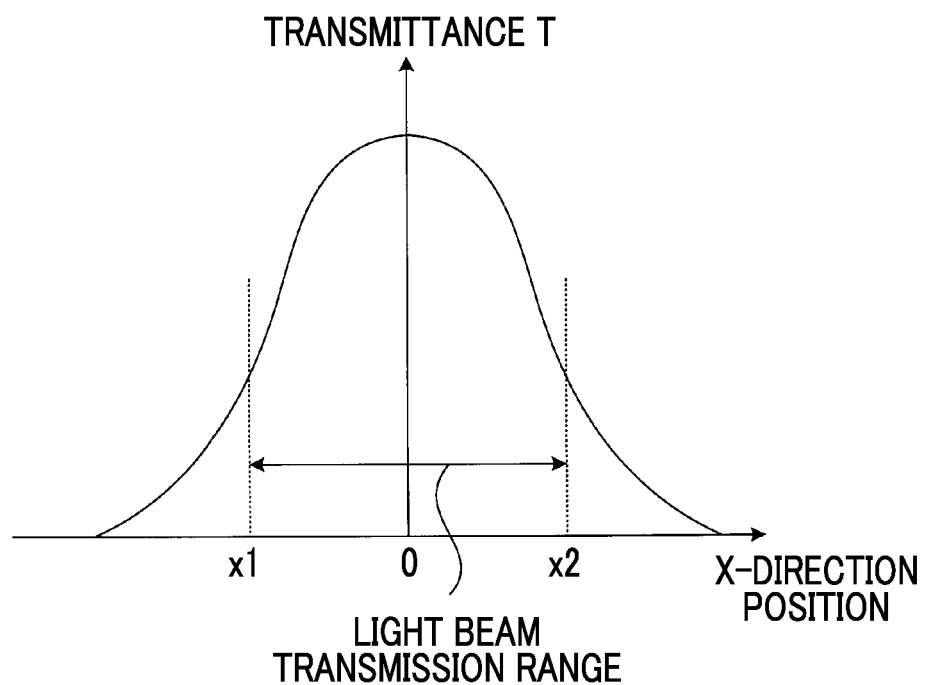
FIG. 9 is a diagram illustrating a transmittance distribution of an APD filter 3.

FIG. 9 is a diagram illustrating the transmittance distribution of the APD filter 3. In FIG. 9, the horizontal axis indicates a position in the X direction and is a position where the origin O intersects the optical axis. The vertical axis indicates transmittance T.

As illustrated in FIG. 9, the APD filter 3 has the characteristics that the transmittance T thereof is the highest at the position which intersects the optical axis and is reduced as the distance from the optical axis increases. Information about the transmittance distribution illustrated in FIG. 9 is stored in the internal memory of the lens device 40.

As illustrated in FIG. 7, a position where the upper light beam passing through the diaphragm 2 is incident on the APD filter 3 in the X direction is x1 and a position where the lower light beam passing through the diaphragm 2 is incident on the APD filter 3 in the X direction is x2. The positions x1 and x2 are illustrated in FIG. 9.

As illustrated in FIG. 8, light is incident on the imaging element 5 in the incident angle range of θ1 to θ2 illustrated in FIG. 8. Light in this range is attenuated by the transmittance T distributed in the range of x1 to x2 illustrated in FIG. 9 and is incident on the imaging element 5.

That is, the light reception sensitivity distributions of the phase difference detection pixels 52A and 52B in a state in which the lens device 40 provided with the APD filter 3 is mounted are the product of light reception sensitivity for each incident angle in the range of θ1 to θ2 illustrated in FIG. 8 and the transmittance of a portion through which light passes at each incident angle in the range of x1 to x2 illustrated in FIG. 9.

It is necessary to convert the horizontal axis of the transmittance distribution of the APD filter 3 into an incident angle in order to perform a process for multiplying the light reception sensitivity distribution illustrated in FIG. 8 by the transmittance distribution illustrated in FIG. 9.

As illustrated in FIG. 7, when the distance between the APD filter 3 and the light receiving surface of the imaging element 5 is D, the X-direction position x1 where the upper light beam passing through the diaphragm 2 is incident on the APD filter 3 is (D×sin θ1)/2. Similarly, the X-direction position x2 where the lower light beam passing through the diaphragm 2 is incident on the APD filter 3 is (D×sin θ2)/2.

Figure 10:
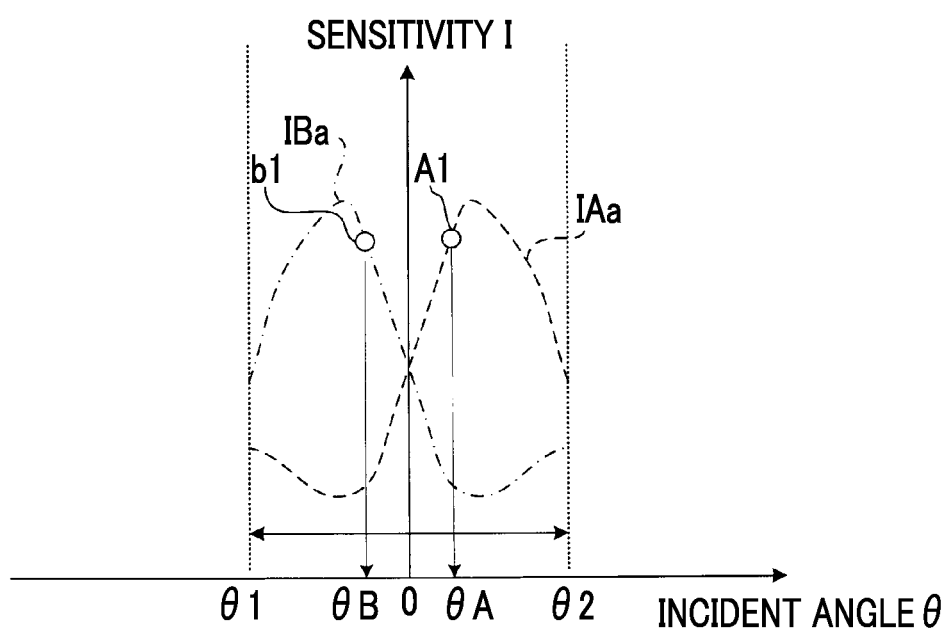
FIG. 10 is a diagram illustrating the light reception sensitivity distributions of the phase difference detection pixels 52A and 52B in a state in which the APD filter 3 is present on an optical axis.

From this relational expression, after the horizontal axis illustrated in FIG. 9 is converted into the incident angle θ, the sensitivity I corresponding to the same incident angle θ is multiplied by the transmittance T to obtain data illustrated in FIG. 10.

FIG. 10 is a diagram illustrating the light reception sensitivity distributions of the phase difference detection pixels 52A and 52B in a state in which the lens device 40 provided with the APD filter 3 is mounted. In FIG. 10, letters IAa indicate the light reception sensitivity distribution of the phase difference detection pixel 52A in the incident angle range of θ1 to θ2 and letters IBa indicate the light reception sensitivity distribution of the phase difference detection pixel 52B in the incident angle range of θ1 to θ2.

The phase difference AF processing unit 19 calculates an incident angle θA which is the center of gravity of sensitivity A1 in the light reception sensitivity distribution IAa in the data illustrated in FIG. 10 and calculates an incident angle θB which is the center of gravity of sensitivity b1 in the light reception sensitivity distribution IBa.

Specifically, the phase difference AF processing unit 19 calculates the incident angle θA and the incident angle θB, using the following Expressions (5) and (6).

$$\theta A = \int \{\theta \times IA(\theta) \times T(x)\}d\theta \bigg/ \int \theta d\theta \quad (5)$$
$$= \int \{\theta \times IA(\theta) \times T(D \times \sin\theta/2)\}d\theta \bigg/ \int \theta d\theta$$

$$\theta B = \int \{\theta \times IB(\theta) \times T(x)\}d\theta \bigg/ \int \theta d\theta \quad (6)$$
$$= \int \{\theta \times IB(\theta) \times T(D \times \sin\theta/2)\}d\theta \bigg/ \int \theta d\theta$$

In Expressions (5) and (6), an integration range is the incident angle range (θ1 to θ2). In addition, IA(θ) indicates the sensitivity of the phase difference detection pixel 52A when the incident angle is θ. IB(θ) indicates the sensitivity of the phase difference detection pixel 52B when the incident angle is θ. T(x) indicates transmittance at a distance x from an intersection point between the APD filter 3 and the optical axis in the X direction.

That is, in the incident angle range (θ1 to θ2), the product of the incident angle θ, the light reception sensitivity IA(θ), and the transmittance T(x) is integrated with respect to the value of θ and the integrated value is divided by the integrated value of θ to calculate the incident angle θA which is the center of gravity of sensitivity. Similarly, in the incident angle range (θ1 to θ2), the product of the incident angle θ, the light reception sensitivity IB(θ), and the transmittance T(x) is integrated with respect to the value of θ and the integrated value is divided by the integrated value of θ to calculate the incident angle θB which is the center of gravity of sensitivity.

Then, the phase difference AF processing unit 19 substitutes θA into θ1 of Expression (4), substitutes θB into θ2 of Expression (4), and substitutes the phase difference calculated by the correlation operation into (a1+a2) of Expression (4) to calculate the amount of defocus Df.

The phase difference AF processing unit 19 substitutes 1 into T(x) in Expressions (5) and (6) to calculate θA and θB in a case in which the lens device 40 without the APD filter 3 is mounted or a state in which the lens device 40 provided with the APD filter 3 is mounted and the APD filter 3 is not inserted into the optical axis.

Figure 11:
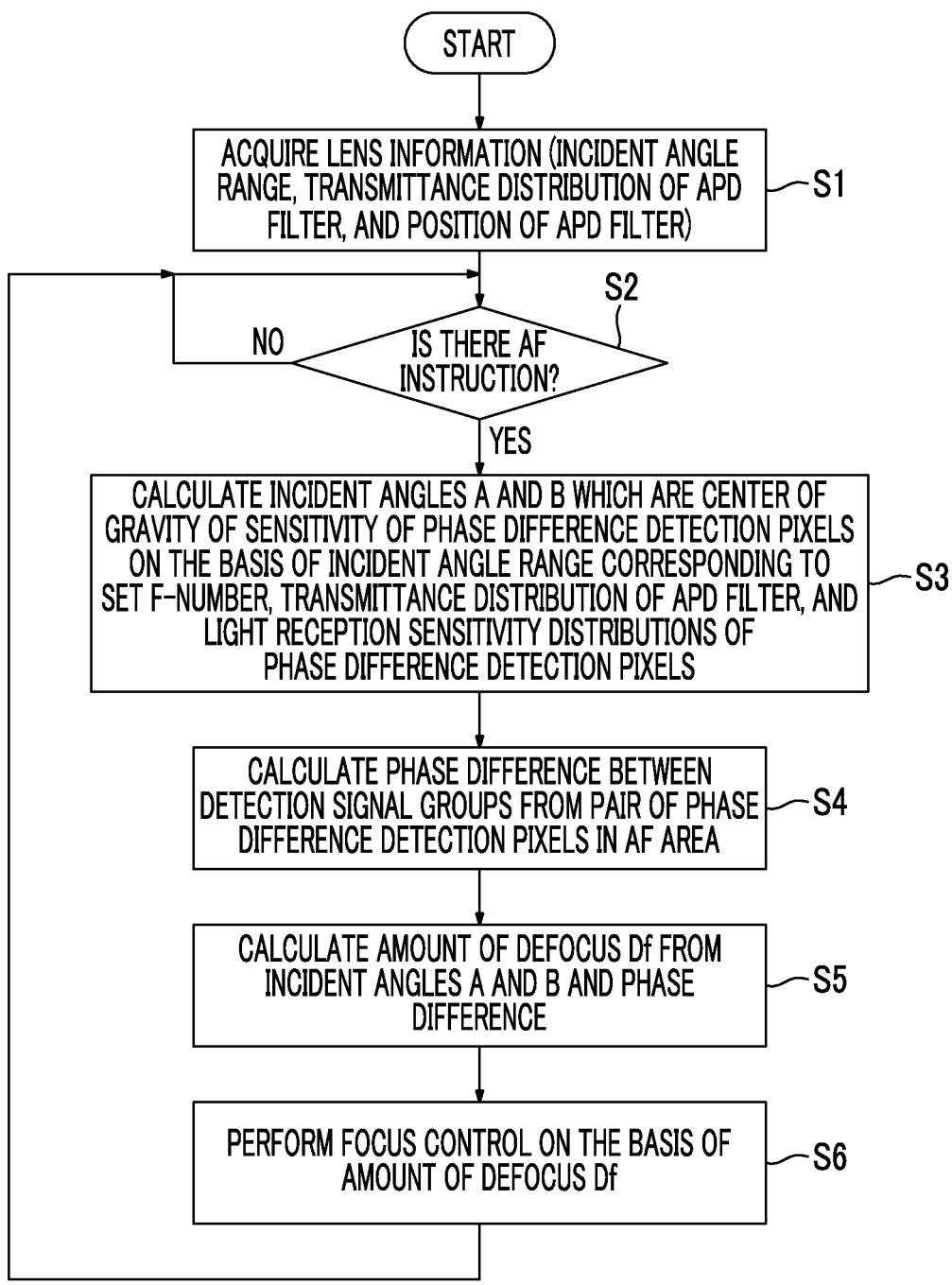
FIG. 11 is a flowchart illustrating the operation of the digital camera illustrated in FIG. 1.

FIG. 11 is a flowchart illustrating an AF operation of the digital camera illustrated in FIG. 1.

When the digital camera is turned on, the system control unit 11 acquires lens information from the lens device 40 and stores the lens information in the main memory 16 (Step S1). Here, the acquired lens information includes information about the incident angle range for each diaphragm value obtained by the imaging optical system, information about the transmittance distribution of the APD filter 3, and the positional information of the APD filter 3 in the optical axis direction (the distance from a connection portion between the lens device 40 and the digital camera body to the APD filter 3).

When the operating unit 14 is operated to input an AF instruction (Step S2: YES), the phase difference AF processing unit 19 acquires information about the incident angle range corresponding to the F-number that is being set from the main memory 16. In addition, the phase difference AF processing unit 19 acquires information about the transmittance distribution of the APD filter 3 from the main memory 16. The phase difference AF processing unit 19 acquires information about the light reception sensitivity distributions of the phase difference detection pixels 52A and 52B of the imaging element 5 from the main memory 16. The phase difference AF processing unit 19 acquires the positional information of the APD filter 3 in the optical axis direction and information about the distance from the connection portion between the lens device 40 and the digital camera body to the light receiving surface of the imaging element 5 from the main memory 16. The distance information is stored in the main memory 16 when the digital camera is manufactured.

Then, the phase difference AF processing unit 19 calculates the distance D between the APD filter 3 and the light receiving surface of the imaging element 5 from the positional information of the APD filter 3 in the optical axis direction and the information about the distance from the connection portion between the lens device 40 and the digital camera body to the light receiving surface of the imaging element 5. Specifically, the sum of the positional information and the distance information is calculated as the distance D.

The phase difference AF processing unit 19 calculates the incident angles θA and θB on the basis of the calculated distance D, the incident angle range corresponding to the set F-number acquired from the main memory 16, and the transmittance distribution of the APD filter 3 acquired from the main memory 16, using Expressions (5) and (6) (Step S3).

Then, the phase difference AF processing unit 19 calculates the phase difference, using the correlation operation between a detection signal group from a plurality of phase difference detection pixels 52A in the selected AF area 53 and a detection signal group from the phase difference detection pixels 52B which form a pair with the phase difference detection pixels 52A (Step S4).

Then, the phase difference AF processing unit 19 calculates the amount of defocus Df, using Expression (4) using the incident angles θA and θB calculated in Step S3 and the phase difference calculated in Step S4 (Step S5).

When the amount of defocus Df is calculated, the system control unit 11 performs focus control for moving the focus lens to the focus position on the basis of the amount of defocus Df (Step S6). After Step S6, the process proceeds to Step S2.

In a case in which the lens device 40 is interchanged, the phase difference AF processing unit 19 performs the process again from Step S1. In a case in which a type in which the APD filter 3 can be inserted into and removed from the optical axis is mounted as the lens device 40, when the determination result in Step S2 is YES, the phase difference AF processing unit 19 determines whether the APD filter 3 has been inserted into the optical axis. In a case in which the APD filter 3 has been inserted into the optical axis, the phase difference AF processing unit 19 performs the process after Step S3. On the other hand, in a case in which the APD filter 3 has not been inserted into the optical axis, the phase difference AF processing unit 19 substitutes 1 into T(x) of Expressions (5) and (6) to calculate the incident angles θA and θB in Step S3.

As described above, according to the digital camera illustrated in FIG. 1, in a case in which the lens device 40 including the APD filter 3 is mounted, it is possible to calculate the amount of defocus considering the transmittance distribution of the APD filter 3. Therefore, even in a case in which the lens device 40 including the APD filter 3 is mounted, the digital camera can be accurately focused on the object.

The lens information may be obtained as follows. Identification information indicating the type of lens is acquired from the lens device 40 and lens information for each identification information item which is stored in the digital camera body in advance is obtained.

First Modification Example

In the above-described embodiment, the incident angle θA which is the center of gravity of sensitivity in the light reception sensitivity distribution IAa and the incident angle θB which is the center of gravity of sensitivity in the light reception sensitivity distribution IBa are calculated to calculate the amount of defocus Df. However, an incident angle θAA which is the center of area of sensitivity in the light reception sensitivity distribution IAa and an incident angle θBB which is the center of area of sensitivity in the light reception sensitivity distribution IBa may be calculated and the incident angle θAA and the incident angle θBB may be substituted into Expression (4) to calculate the amount of defocus Df.

Figure 12:
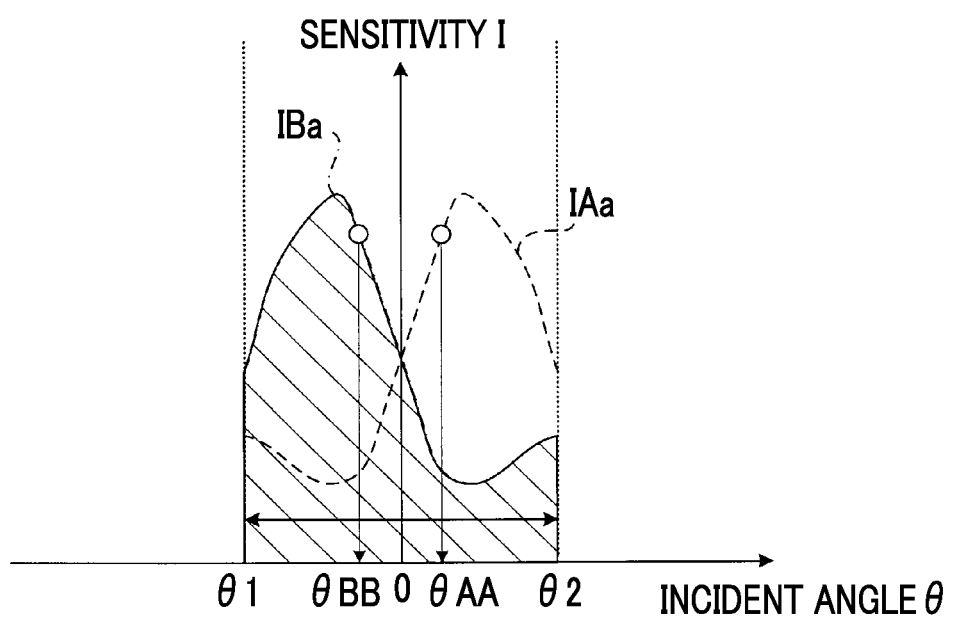
FIG. 12 is a diagram illustrating a modification example of a method for calculating the amount of defocus.

The method disclosed in WO2013/047111A may be used as a method for calculating the position of the center of area of sensitivity. That is, in FIG. 12, an incident angle at an intersection point between the horizontal axis and a line which halves the area of a region surrounded by the light reception sensitivity distribution IBa and the horizontal axis and is parallel to the vertical axis is θBB. In addition, an incident angle at an intersection point between the horizontal axis and a line which halves the area of a region surrounded by the light reception sensitivity distribution IAa and the horizontal axis and is parallel to the vertical axis is θAA.

Second Modification Example

In the above-described embodiment, one incident angle θA and one incident angle θB are calculated in one AF area 53. However, in this modification example, the AF area 53 is divided into a plurality of areas and the incident angles θA and θB are calculated for each divided area. Then, the average value of the incident angles θA (θB) calculated for each divided area is calculated and the average values are used as the incident angles θA and θB corresponding to the AF area 53.

The object image formed on the light receiving surface of the imaging element 5 is not necessarily formed at the center of the imaging element 5 and is present at any coordinate position, such as a high position, a lower position, a right position, or a left position from the center of the light receiving surface. Therefore, it is preferable to use the method that divides the AF area 53 into a plurality of areas and calculates the incident angles θA and θB for each divided area in order to improve accuracy.

The incident angle range varied depending on an image height. Therefore, it is preferable to calculate the incident angles θA and θB for each divided area in order to improve the accuracy of calculation.

Third Modification Example

In the above-described embodiment, the lens device 40 comprises one APD filter 3. The lens device 40 may comprise a plurality of APD filters. In this structure, for each of the plurality of APD filters, a light beam transmission range in the transmittance distribution illustrated in FIG. 9 is calculated and the transmittance distribution in the light beam transmission range is used to calculate the incident angles θA and θB.

For example, in a case in which the lens device 40 including two APD filters is mounted, Expressions (5) and (6) are changed to the following Expressions (7) and (8) to calculate the incident angles θA and θB.

$$\theta A = \int \{\theta \times IA(\theta) \times T1(x) \times T2(x)\} d\theta / \int \theta d\theta \quad (7)$$

$$\theta B = \int \{\theta \times IB(\theta) \times T1(x) \times T2(x)\} d\theta / \int \theta d\theta \quad (8)$$

T1(x) indicates the transmittance of one of the two APD filters at an X-direction position x3. T2(x) indicates the transmittance of other of the two APD filters at an X-direction position x4. The X-direction position x3 and the X-direction position x4 are positions on the APD filter where light that is incident on the imaging element 5 at an arbitrary incident angle in the incident angle range intersects the APD filter.

T1(x) can be converted into angular information, using information about the distance between one of the APD filters and the light receiving surface of the imaging element 5. T2(x) can be converted into angular information, using information about the distance between the other APD filter and the light receiving surface of the imaging element 5.

The digital camera has been described above as an example of the imaging device. Next, an embodiment of a smart phone with a camera as the imaging device will be described.

Figure 13:
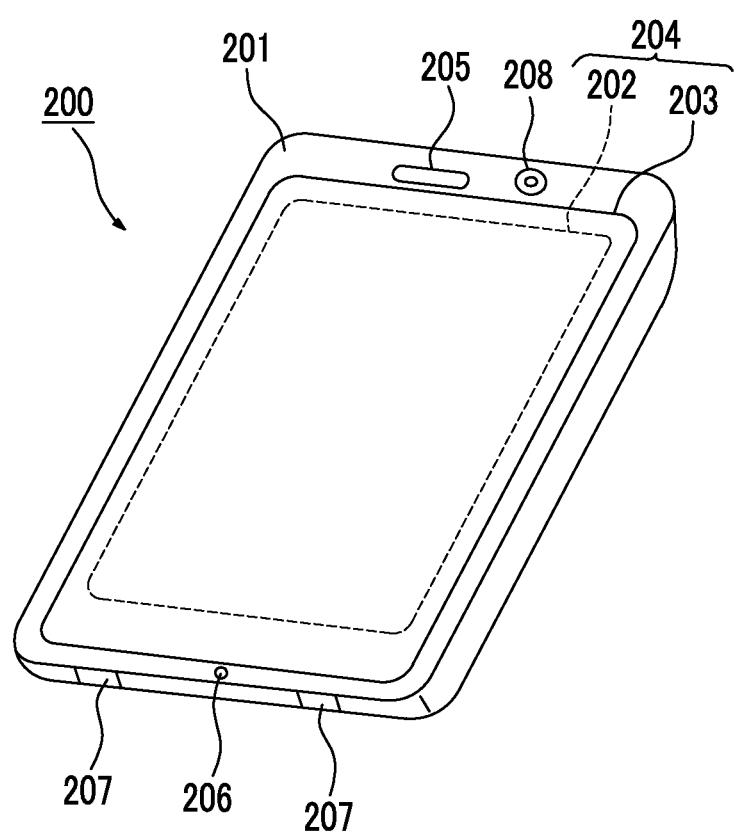
FIG. 13 is a diagram illustrating the structure of a smart phone as the imaging device.

FIG. 13 is a diagram illustrating the outward appearance of a smart phone 200 which is an embodiment of the imaging device according to the invention. The smart phone 200 illustrated in FIG. 13 comprises a housing 201 with a flat panel shape and a display input unit 204 having a display panel 202 as a display unit and an operation panel 203 as an input unit which are integrally formed on one surface of the housing 201. The housing 201 comprises a speaker 205, a microphone 206, an operating unit 207, and a camera unit 208. However, the configuration of the housing 201 is not limited thereto. For example, the display unit and the input unit may be independently provided, or the housing 201 may have a folding structure or a sliding structure.

Figure 14:
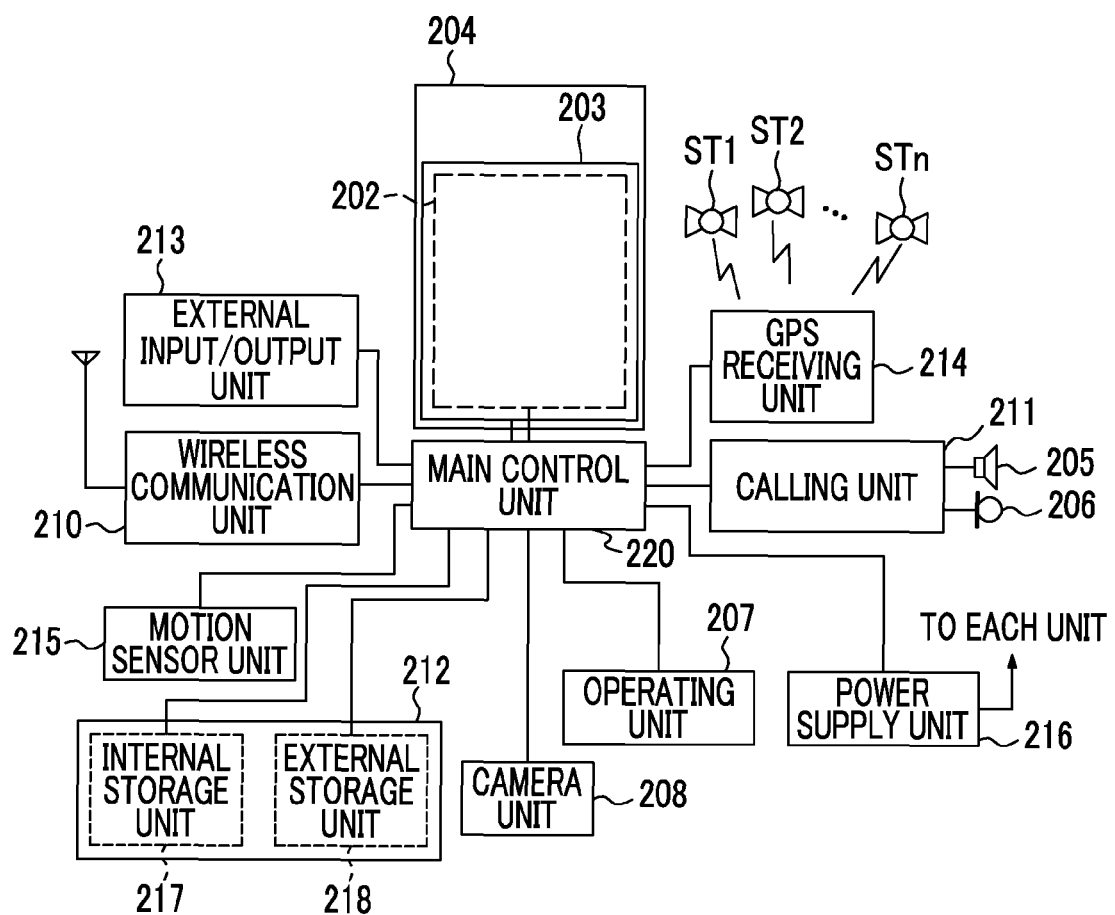
FIG. 14 is a block diagram illustrating the smart phone illustrated in FIG. 13.

FIG. 14 is a block diagram illustrating the structure of the smart phone 200 illustrated in FIG. 13. As illustrated in FIG. 14, the smart phone 200 comprises, as main components, a wireless communication unit 210, the display input unit 204, a calling unit 211, the operating unit 207, the camera unit 208, a storage unit 212, an external input/output unit 213, a global positioning system (GPS) receiving unit 214, a motion sensor unit 215, a power supply unit 216, and a main control unit 220. In addition, the smart phone 200 has, as a main function, a wireless communication function which performs mobile wireless communication through a base station apparatus BS (not illustrated) and a mobile communication network NW (not illustrated).

The wireless communication unit 210 performs wireless communication with the base station apparatus BS which is accommodated in the mobile communication network NW in response to an instruction from the main control unit 220. The wireless communication is used to transmit and receive various types of file data, such as voice data and image data, and electronic mail data or to receive, for example, web data or streaming data.

The display input unit 204 is a so-called touch panel that displays, for example, images (still images and moving images) or text information to visually transmit information to the user and detects the user's operation for the displayed information under the control of the main control unit 220 and comprises the display panel 202 and the operation panel 203.

The display panel 202 uses, for example, a liquid crystal display (LCD) or an organic electro-luminescence display (OELD) as a display device.

The operation panel 203 is a device that is provided such that an image displayed on a display surface of the display panel 202 is visually recognized and detects one or a plurality of coordinate points operated by a finger of the user or a stylus. When the device is operated by a finger of the user or a stylus, a detection signal which is generated by the operation is output to the main control unit 220. Then, the main control unit 220 detects an operation position (coordinates) on the display panel 202 on the basis of the received detection signal.

As illustrated in FIG. 13, the display panel 202 and the operation panel 203 of the smart phone 200 which is described as an embodiment of the imaging device according to the invention are integrated to form the display input unit 204 and the operation panel 203 is provided so as to completely cover the display panel 202.

In a case in which this arrangement is used, the operation panel 203 may have a function of detecting the user's operation even in a region other than the display panel 202.

In other words, the operation panel 203 may comprise a detection region (hereinafter, referred to as a display region) for an overlap portion which overlaps the display panel 202 and a detection region (hereinafter, referred to as a non-display region) for an outer edge portion which does not overlap the display panel 202.

The size of the display region may be exactly equal to the size of the display panel 202. However, the sizes are not necessarily equal to each other. The operation panel 203 may comprise two sensitive regions, that is, an outer edge portion and an inner portion other than the outer edge portion. The width of the outer edge portion is appropriately designed according to, for example, the size of the housing 201. Examples of a position detecting method which is used in the operation panel 203 include a matrix switching method, a resistive film method, a surface elastic wave method, an infrared method, an electromagnetic induction method, and a capacitive sensing method. Any of the methods may be used.

The calling unit 211 comprises the speaker 205 and the microphone 206. The calling unit 211 converts the voice of the user which is input through the microphone 206 into voice data which can be processed by the main control unit 220 and outputs the converted voice data to the main control unit 220. In addition, the calling unit 211 decodes voice data received by the wireless communication unit 210 or the external input/output unit 213 and outputs the decoded voice data from the speaker 205. As illustrated in FIG. 13, for example, the speaker 205 can be mounted on the same surface as the display input unit 204 and the microphone 206 can be mounted on a side surface of the housing 201.

The operating unit 207 is a hardware key which uses, for example, a key switch and receives instructions from the user. For example, as illustrated in FIG. 13, the operating unit 207 is a push button switch which is mounted on a side surface of the housing 201 of the smart phone 200, is turned on when it is pressed by, for example, a finger, and is turned off by the restoring force of a spring when the finger is taken off.

The storage unit 212 stores a control program or control data of the main control unit 220, application software, address data which is associated with, for example, the names or phone numbers of communication partners, and transmitted and received electronic mail data, web data which is downloaded by web browsing, or downloaded content data. In addition, the storage unit 212 temporarily stores, for example, streaming data. The storage unit 212 includes an internal storage unit 217 which is provided in the smart phone and an external storage unit 218 which has an attachable and detachable external memory slot. The internal storage unit 217 and the external storage unit 218 forming the storage unit 212 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 213 functions as an interface with all of the external apparatuses connected to the smart phone 200 and is directly or indirectly connected to other external apparatuses by communication (for example, universal serial bus (USB) communication or IEEE1394) or a network (for example, the Internet, a wireless LAN, a Bluetooth (registered trademark) network, a radio frequency identification (RFID) network, an infrared data association (IrDA (registered trademark)) network, an ultra wideband (UWB) (registered trademark) network or a ZigBee (registered trademark) network).

Examples of the external apparatus connected to the smart phone 200 include a wired/wireless headset, a wired/wireless external charger, a wired/wireless data port, a memory card which is connected through a card socket, a subscriber identity module card (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 213 can transmit data which is received from the external apparatus to each component of the smart phone 200 or can transmit data in the smart phone 200 to the external apparatus.

The GPS receiving unit 214 receives GPS signals transmitted from GPS satellites ST1 to STn and performs a position measurement process on the basis of a plurality of received GPS signals to detect a position including the latitude, longitude, and height of the smart phone 200, in response to an instruction from the main control unit 220. When the GPS receiving unit 214 can acquire positional information from the wireless communication unit 210 or the external input/output unit 213 (for example, a wireless LAN), it can detect the position using the positional information.

The motion sensor unit 215 comprises, for example, a triaxial acceleration sensor and detects the physical movement of the smart phone 200 in response to an instruction from the main control unit 220. When the physical movement of the smart phone 200 is detected, the moving direction or acceleration of the smart phone 200 is detected. The detection result is output to the main control unit 220.

The power supply unit 216 supplies power which is stored in a battery (not illustrated) to each unit of the smart phone 200 in response to an instruction from the main control unit 220.

The main control unit 220 comprises a microprocessor, operates on the basis of the control program or control data stored in the storage unit 212, and controls the overall operation of each unit of the smart phone 200. The main control unit 220 has an application processing function and a mobile communication control function of controlling each unit of a communication system in order to perform voice communication or data communication through the wireless communication unit 210.

The application processing function is implemented by the operation of the main control unit 220 based on the application software which is stored in the storage unit 212. Examples of the application processing function include an infrared communication function which controls the external input/output unit 213 such that data communication with an opposing apparatus is performed, an electronic mail function which transmits and receives electronic mail, and a web browsing function which browses web pages.

The main control unit 220 has, for example, an image processing function which displays an image on the display input unit 204 on the basis of image data (data of a still image or a moving image) such as received data or downloaded streaming data. The image processing function means the function of the main control unit 220 decoding the image data, performing image processing on the decoding result, and displaying the image on the display input unit 204.

The main control unit 220 performs display control for the display panel 202 and operation detection control for detecting the operation of the user through the operating unit 207 and the operation panel 203. The main control unit 220 performs the display control to display a software key, such as an icon for starting application software or a scroll bar, or to display a window for creating electronic mail. The scroll bar means a software key for receiving an instruction to move a displayed portion of an image that is too large to fit into the display region of the display panel 202.

The main control unit 220 performs the operation detection control to detect the operation of the user input through the operating unit 207, to receive an operation for the icon or the input of a character string to an input field of the window through the operation panel 203, or to receive a request to scroll the displayed image through the scroll bar.

In addition, the main control unit 220 has a touch panel control function that performs the operation detection control to determine whether the position of an operation for the operation panel 203 is an overlap portion (display region) which overlaps the display panel 202 or an outer edge portion (non-display region) which does not overlap the display panel 202 other than the overlap portion and controls a sensitive region of the operation panel 203 or the display position of the software key.

The main control unit 220 can detect a gesture operation for the operation panel 203 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 208 includes components other than the external memory control unit 20, the recording medium 21, the display control unit 22, the display unit 23, and the operating unit 14 of the digital camera illustrated in FIG. 1.

The image data captured by the camera unit 208 can be recorded in the storage unit 212 or can be output through the external input/output unit 213 or the wireless communication unit 210.

In the smart phone 200 illustrated in FIG. 13, the camera unit 208 is mounted on the same surface as the display input unit 204. However, the mounting position of the camera unit 208 is not limited thereto. For example, the camera unit 208 may be mounted on the rear surface of the display input unit 204.

The camera unit 208 can be used for various functions of the smart phone 200. For example, the image acquired by the camera unit 208 can be displayed on the display panel 202 or the image acquired by the camera unit 208 can be used as one of the operation inputs of the operation panel 203.

When the GPS receiving unit 214 detects the position, the position may be detected with reference to the image from the camera unit 208. In addition, the optical axis direction of the camera unit 208 in the smart phone 200 may be determined or the current usage environment may be determined, with reference to the image from the camera unit 208, using the triaxial acceleration sensor or without using the triaxial acceleration sensor. Of course, the image from the camera unit 208 may be used in the application software.

For example, the positional information which is acquired by the GPS receiving unit 214, the voice information which is acquired by the microphone 206 (for example, the main control unit may convert the voice information into text information), and the posture information which is acquired by the motion sensor unit 215 may be added to the image data of a still image or a moving image and the image data may be recorded in the storage unit 212 and may be output through the external input/output unit 213 or the wireless communication unit 210.

In the smart phone 200 having the above-mentioned structure, accessories that can mount the lens device 40 including the APD filter 3 can be provided and the imaging element 5 can be used as an imaging element of the camera unit 208. When the accessories are mounted, the process illustrated in FIG. 11 can be performed to focus the smart phone on the object with high accuracy.

As described above, the specification discloses the following.

A disclosed imaging device comprises: an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received; a defocus amount calculation unit that, in a state in which an optical filter, of which the transmittance is reduced as a distance from a center of an optical axis of the imaging optical system in a direction perpendicular to the optical axis increases, is present on the optical axis of the imaging optical system, acquires an incident angle range of light on the pair through the imaging optical system, a transmittance distribution of the optical filter, and a light reception sensitivity distribution indicating light reception sensitivity of each of the pair for each incident angle of incident light, calculates a parameter related to a ratio of a phase difference between detection signals detected by the pair to the amount of defocus on the basis of the acquired incident angle range, the acquired transmittance distribution and the acquired light reception sensitivity distribution, and calculates the amount of defocus using the calculated parameter and the phase difference; and a focus control unit that performs focus control for moving the focus lens in an optical axis direction on the basis of the amount of defocus calculated by the defocus amount calculation unit.

In the disclosed imaging device, the defocus amount calculation unit calculates the transmittance of a region of the optical filter, through which light in the incident angle range passes, with respect to light at each incident angle, using the transmittance distribution, and calculates, as the parameter, an incident angle which is the center of gravity of sensitivity or the center of area of sensitivity in a light reception sensitivity distribution obtained by multiplying light reception sensitivity of a portion corresponding to the incident angle range in the light reception sensitivity distribution for each incident angle by the transmittance calculated for each incident angle.

In the disclosed imaging device, the defocus amount calculation unit calculates the transmittance of a region of the optical filter, through which light in the incident angle range passes, with respect to light at each incident angle, on the basis of the transmittance distribution and a position where each light beam is incident in a phase difference detection direction in the optical filter, which is determined by a relationship between a distance between a light receiving surface of the imaging element and the optical filter and the incident angle of each light component in the incident angle range on the optical filter.

In the disclosed imaging device, the imaging optical system is interchangeable, and the defocus amount calculation unit acquires information about the incident angle range and the transmittance distribution from the imaging optical system.

A disclosed focus control method is performed by an imaging device comprising an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received. The focus control method comprises: a defocus amount calculation step of, in a state in which an optical filter, of which the transmittance is reduced as a distance from a center of an optical axis of the imaging optical system in a direction perpendicular to the optical axis increases, is present on the optical axis of the imaging optical system, acquiring an incident angle range of light on the pair through the imaging optical system, a transmittance distribution of the optical filter, and a light reception sensitivity distribution indicating light reception sensitivity of each of the pair for each incident angle of incident light, calculating a parameter related to a ratio of a phase difference between detection signals detected by the pair to the amount of defocus on the basis of the acquired incident angle range, the acquired transmittance distribution and the acquired light reception sensitivity distribution, and calculating the amount of defocus using the calculated parameter and the phase difference; and a focus control step of performing focus control for moving the focus lens in an optical axis direction on the basis of the amount of defocus calculated in the defocus amount calculation step.

In the disclosed focus control method performed by the imaging device, in the defocus amount calculation step, the transmittance of a region of the optical filter, through which light in the incident angle range passes, with respect to light at each incident angle is calculated, using the transmittance distribution, and an incident angle which is the center of gravity of sensitivity or the center of area of sensitivity in a light reception sensitivity distribution obtained by multiplying light reception sensitivity of a portion corresponding to the incident angle range in the light reception sensitivity distribution for each incident angle by the transmittance calculated for each incident angle is calculated as the parameter.

In the disclosed focus control method performed by the imaging device, in the defocus amount calculation step, the transmittance of a region of the optical filter, through which light in the incident angle range passes, with respect to light at each incident angle is calculated on the basis of the transmittance distribution and a position where each light beam is incident in a phase difference detection direction in the optical filter, which is determined by a relationship between a distance between a light receiving surface of the imaging element and the optical filter and the incident angle of each light component in the incident angle range on the optical filter.

In the disclosed focus control method performed by the imaging device, the imaging optical system is interchangeable in the imaging device. In the defocus amount calculation step, information about the incident angle range and the transmittance distribution is acquired from the imaging optical system.

INDUSTRIAL APPLICABILITY

The invention is particularly applied to, for example, digital cameras and is convenient and effective.

The invention has been described in detail above with reference to a specific embodiment. However, it will be understood by those skilled in the art that various modifications and changes of the invention can be made without departing from the scope and spirit of the invention.

This application is based on JP2014-185162 filed Sep. 11, 2014, the content of which is incorporated herein by reference.

EXPLANATION OF REFERENCES

1: imaging lens
2: diaphragm
3: APD filter (optical filter)
40: lens device (imaging optical system)
5: imaging element
11: system control unit (focus control unit)
19: phase difference AF processing unit (defocus amount calculation unit)

What is claimed is:

1. An imaging device comprising:
an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received;
a defocus amount calculation unit that, in a state in which an optical filter, of which transmittance is reduced as a distance from a center of an optical axis of the imaging optical system in a direction perpendicular to the optical axis increases, is present on the optical axis of the imaging optical system, acquires an incident angle range of light on the pair through the imaging optical system, a transmittance distribution of the optical filter, and a light reception sensitivity distribution indicating light reception sensitivity of each of the pair for each incident angle of incident light, calculates a parameter related to a ratio of a phase difference between detection signals detected by the pair to an amount of defocus based on the acquired incident angle range, the acquired transmittance distribution and the acquired light reception sensitivity distribution, and calculates the amount of defocus using the calculated parameter and the phase difference; and
a focus control unit that performs focus control for moving the focus lens in an optical axis direction based on the amount of defocus calculated by the defocus amount calculation unit.

2. The imaging device according to claim 1,
wherein the defocus amount calculation unit calculates the transmittance of a region of the optical filter, through which light in the incident angle range passes, with respect to light at each incident angle, using the transmittance distribution, and calculates, as the parameter, an incident angle which is a center of gravity of sensitivity or a center of area of sensitivity in a light reception sensitivity distribution obtained by multiplying light reception sensitivity of a portion corresponding to the incident angle range in the light reception sensitivity distribution for each incident angle by the transmittance calculated for each incident angle.

3. The imaging device according to claim 2,
wherein the defocus amount calculation unit calculates the transmittance of a region of the optical filter, through which light in the incident angle range passes, with respect to light at each incident angle, based on the transmittance distribution and a position where each light beam is incident in a phase difference detection direction in the optical filter, which is determined by a relationship between a distance between a light receiving surface of the imaging element and the optical filter and the incident angle of each light component in the incident angle range on the optical filter.

4. The imaging device according to claim 1,
wherein the imaging optical system is interchangeable, and
the defocus amount calculation unit acquires information about the incident angle range and the transmittance distribution from the imaging optical system.

5. The imaging device according to claim 2,
wherein the imaging optical system is interchangeable, and
the defocus amount calculation unit acquires information about the incident angle range and the transmittance distribution from the imaging optical system.

6. The imaging device according to claim 3,
wherein the imaging optical system is interchangeable, and
the defocus amount calculation unit acquires information about the incident angle range and the transmittance distribution from the imaging optical system.

7. A focus control method performed by an imaging device comprising an imaging element that captures an image of an object through an imaging optical system including a focus lens and includes a pair of a first signal detection unit which receives one of a pair of light beams passing through different portions of a pupil region of the imaging optical system and detects a signal corresponding to an amount of light received and a second signal detection unit which receives other of the pair of light beams and detects a signal corresponding to an amount of light received, the method comprising:
in a state in which an optical filter, of which transmittance is reduced as a distance from a center of an optical axis of the imaging optical system in a direction perpendicular to the optical axis increases, is present on the optical axis of the imaging optical system, acquiring an incident angle range of light on the pair through the imaging optical system, a transmittance distribution of the optical filter, and a light reception sensitivity distribution indicating light reception sensitivity of each of the pair for each incident angle of incident light, calculating a parameter related to a ratio of a phase difference between detection signals detected by the pair to an amount of defocus based on the acquired incident angle range, the acquired transmittance distribution and the acquired light reception sensitivity distribution, and calculating the amount of defocus using the calculated parameter and the phase difference; and
performing focus control for moving the focus lens in an optical axis direction based on the calculated amount of defocus.

8. The focus control method according to claim 7,
wherein, in the calculating of the parameter, the transmittance of a region of the optical filter, through which light in the incident angle range passes, with respect to light at each incident angle is calculated, using the transmittance distribution, and an incident angle which is a center of gravity of sensitivity or a center of area of sensitivity in a light reception sensitivity distribution obtained by multiplying light reception sensitivity of a portion corresponding to the incident angle range in the light reception sensitivity distribution for each incident angle by the transmittance calculated for each incident angle is calculated as the parameter.

9. The focus control method according to claim 8,
wherein, in the calculating of the parameter, the transmittance of a region of the optical filter, through which light in the incident angle range passes, with respect to light at each incident angle is calculated based on the transmittance distribution and a position where each light beam is incident in a phase difference detection direction in the optical filter, which is determined by a relationship between a distance between a light receiving surface of the imaging element and the optical filter and the incident angle of each light component in the incident angle range on the optical filter.

10. The focus control method according to claim 7,
wherein the imaging optical system is interchangeable in the imaging device, and
in the acquiring of the incident angle range and the transmittance distribution, information about the incident angle range and the transmittance distribution is acquired from the imaging optical system.

11. The focus control method according to claim 8,
wherein the imaging optical system is interchangeable in the imaging device, and
in the acquiring of the incident angle range and the transmittance distribution, information about the incident angle range and the transmittance distribution is acquired from the imaging optical system.

12. The focus control method according to claim 9,
wherein the imaging optical system is interchangeable in the imaging device, and
in the acquiring of the incident angle range and the transmittance distribution, information about the incident angle range and the transmittance distribution is acquired from the imaging optical system.

* * * * *